United States Patent [19]
Snyder et al.

[11] Patent Number: 5,896,906
[45] Date of Patent: Apr. 27, 1999

[54] VEHICLE TIRE, ANTI-SKID DEVICE

[76] Inventors: Phillip J. Snyder, 6007 Douglas Dr., Yakima, Wash. 98908; Jerrod L. Snyder, 1650 - 134th Ave. SE. #208, Bellevue, Wash. 98005

[21] Appl. No.: 08/734,395

[22] Filed: Oct. 17, 1996

[51] Int. Cl.$^6$ .............................. B60C 27/10; B60C 27/22
[52] U.S. Cl. .............................. 152/220; 152/219; 152/239
[58] Field of Search .............................. 152/232, 233, 152/174, 186, 216, 213 A, 217, 218, 219, 220, 223, 231, 239, 241, 242

[56] References Cited

U.S. PATENT DOCUMENTS

| | | | |
|---|---|---|---|
| 1,273,271 | 7/1918 | Purdie | 152/232 X |
| 2,065,638 | 12/1936 | Blum | 152/232 X |
| 2,273,753 | 2/1942 | Gelinas | 152/231 |
| 2,733,748 | 2/1956 | Cranston, Sr. | 152/231 |
| 2,986,190 | 5/1961 | Lamb | 152/216 |
| 3,051,211 | 8/1962 | Colosimo | 152/220 |
| 3,095,919 | 7/1963 | Yohe | 152/236 |
| 3,426,824 | 2/1969 | Mazzella | 152/242 |

*Primary Examiner*—Francis J. Lorin
*Attorney, Agent, or Firm*—Dean A. Craine

[57] ABSTRACT

An anti-skid device, capable of being classified as an "improved" traction device, for tires in a single or dual wheel arrangement having two retaining rings pre-installed on the outer and inner surfaces of the wheel hub. Each retaining ring is designed to adjust in length to fit closely within a recessed surface located on the outside and inside surfaces of the wheel hub. Each retaining ring remains attached to the wheel hub between uses. A plurality of chain segments are disposed transversely over the inside and outside sidewalls and tire tread. The opposite ends of each chain segment are attached to the distal ends of two opposite arm members radially aligned and attached at their proximal ends to the two retaining rings. The arm members are transversely aligned over the sides of the wheel hub and terminate near the outer edge of the hub. An elastic member and a hook member are used to attach the end of each chain segment to the adjacent arm member.

5 Claims, 4 Drawing Sheets

VEHICLE TIRE, ANTI-SKID DEVICE

BACKGROUND OF THE INVENTION

1. Field of the Invention

This invention relates to anti-skid devices for vehicles and, more particularly, to such devices designed to be easily and securely attached to a vehicle tire.

2. Description of the Related Art

Many states require "approved" traction devices to be used on motor vehicle tires in order to drive on a roadway during inclement weather conditions. In order to be classified as an "approved" traction device, the device must be capable of being securely attached to the tire and must be made of chain or cable material.

It is well known that installing and removing tire chains from vehicle tires in inclement weather conditions can be dangerous and difficult. This is especially true when attaching and removing tire chains on large vehicles, such as semi-tractors, having dual rear wheels.

Typically, the chains used on large vehicles are heavy and difficult for one individual to position over the tire. Once initially positioned over the tire, the vehicle must be driven forward or rearward to position the chain completely around the tire. The ends of the chain are interconnected and secondary chains or straps are used to hold the chain in place around on the tires. Unfortunately, these secondary chains or straps can disengage during use.

An anti-skid device for a vehicle wheel is needed that can be classified as an "improved" traction device which can be easily installed and removed by one individual. Such an anti-skid device is needed which can be used on both single or dual tire arrangements.

SUMMARY OF THE INVENTION

It is an object of the invention to provide a device that can be used as an anti-skid device.

It is another object of the invention to provide such a device that can be easily and safely installed and removed by one individual and which can be used on both single or dual tire arrangements.

It is a further object of the invention to provide such a device that can be securely attached to the tire and made of chain or cable material so it can be considered an "improved" traction device.

These and other objects are met by providing an anti-skid device that includes two adjustable retaining rings preinstalled on the inner and outer surfaces of a single wheel hub or to the inner and outer wheel hubs on a dual hub arrangement. Each retaining ring is adjustable in circumference to fit snuggly in the indented or recessed surface located near the back wall and sides of a typical wheel hub. Radially aligned on each retaining ring are a plurality of arm members which extend outward perpendicularly therefrom and adjacent to the sides of the wheel hub. The arm members terminate near the outer edge of the wheel hub. Disposed between two arm members and located on opposite sides of the wheel hub is an attachable, flexing road engaging segment. Each road engaging segment easily attaches at one end to the distal end of an arm member located on one side of the wheel hub. The road engaging segment then extends downward over the adjacent sidewall, over the tire's tread surface, and upward over the opposite sidewall. The opposite end of the road engaging segment is then attached to the distal end of the arm member located on the opposite side of the wheel hub or adjacent wheel hub. The length of each road engaging segment is sufficient so that it remains securely in place on the tire during use. In the preferred embodiment, the road engaging segment is a chain or cable. An adjustable attachment means is provided for easily attaching the end of the road engaging segment to the distal ends of the arm members. The adjustable attachment means also enables each road engaging segment to flex or adjust in length during use.

DESCRIPTION OF THE PREFERRED EMBODIMENT(S)

Figure 1:
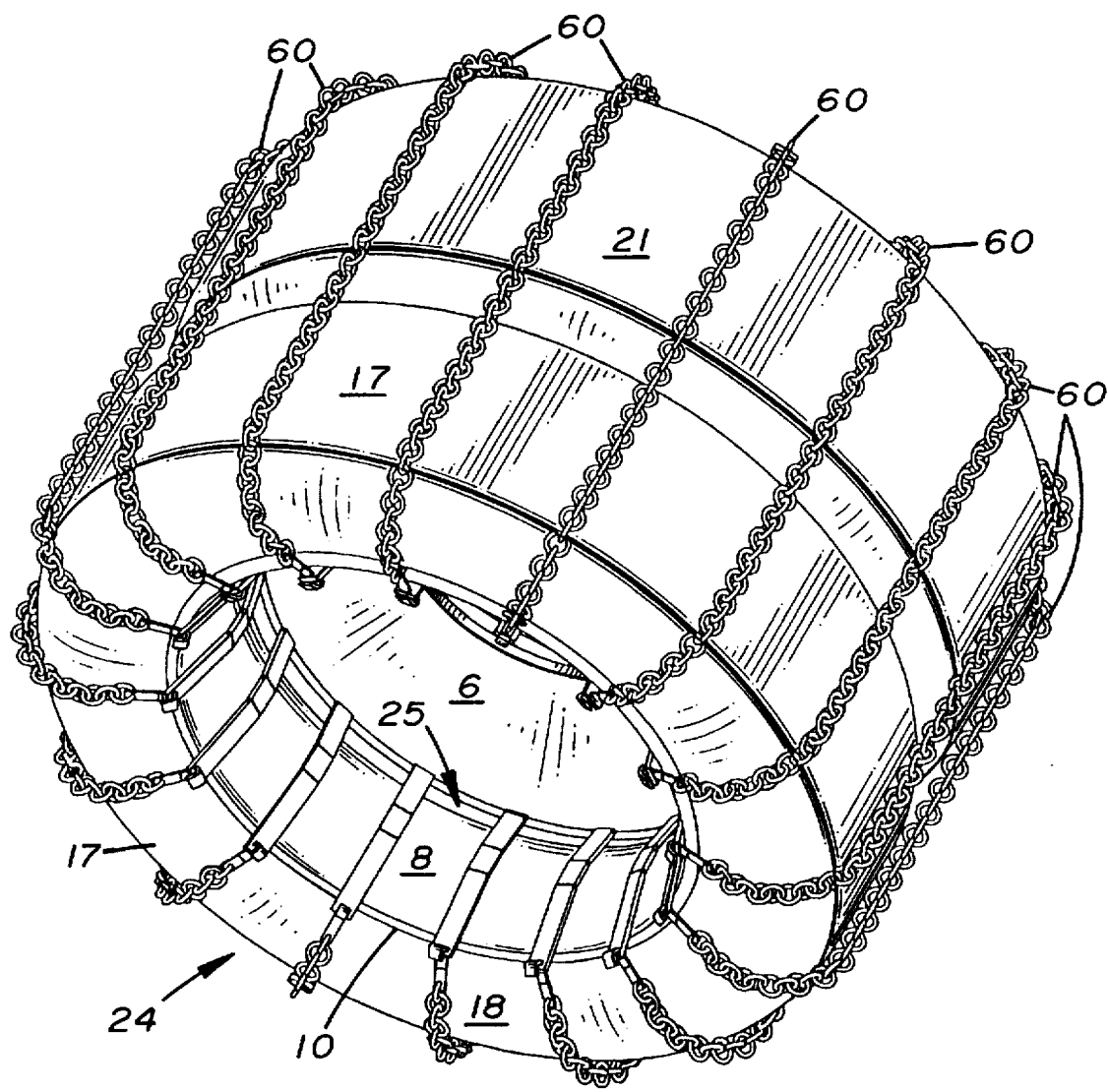
FIG. 1 is a perspective view of the invention disclosed herein installed around two adjacent tires.
Figure 2:
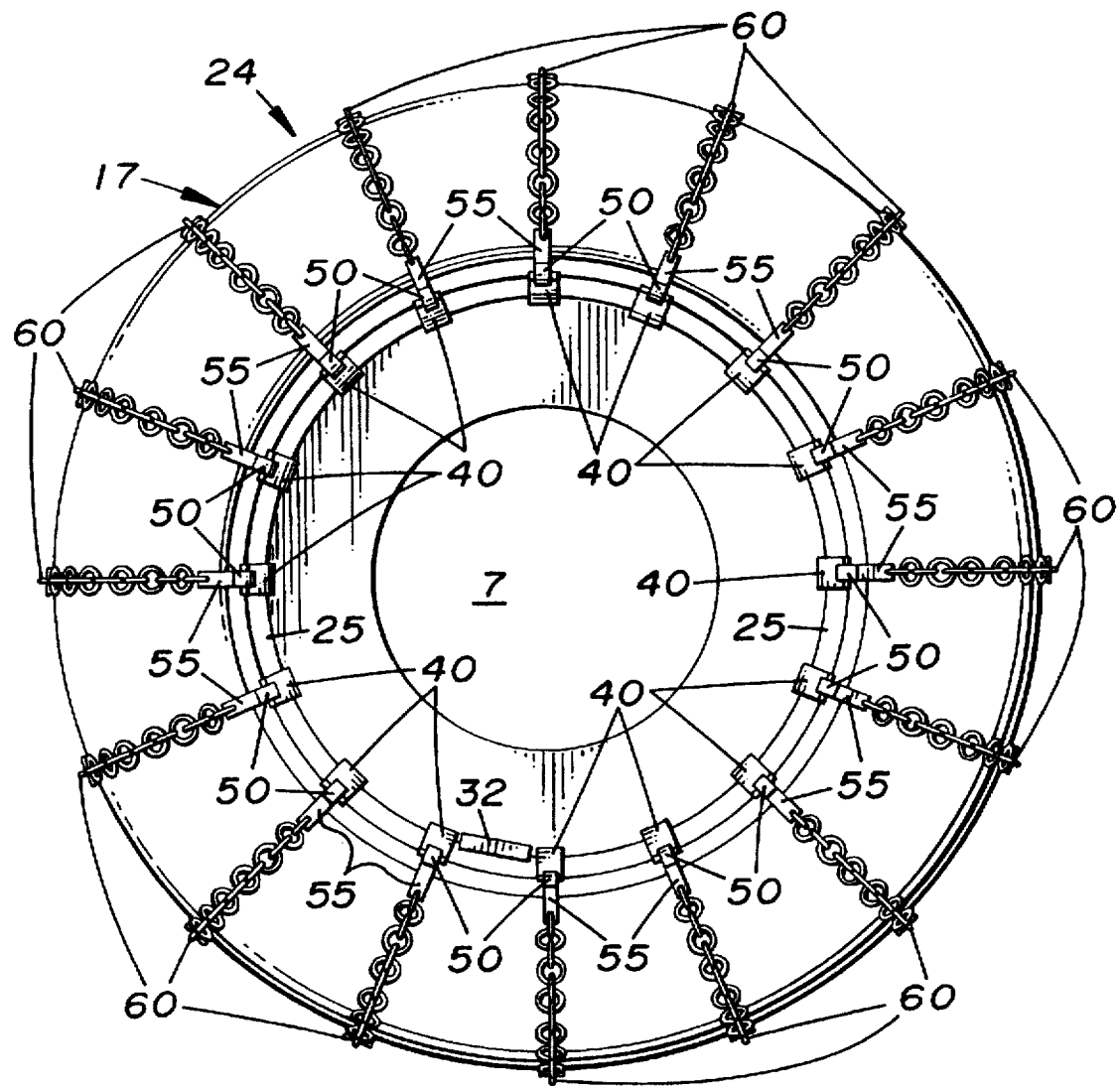
FIG. 2 is a side elevational view of the invention.
Figure 3:
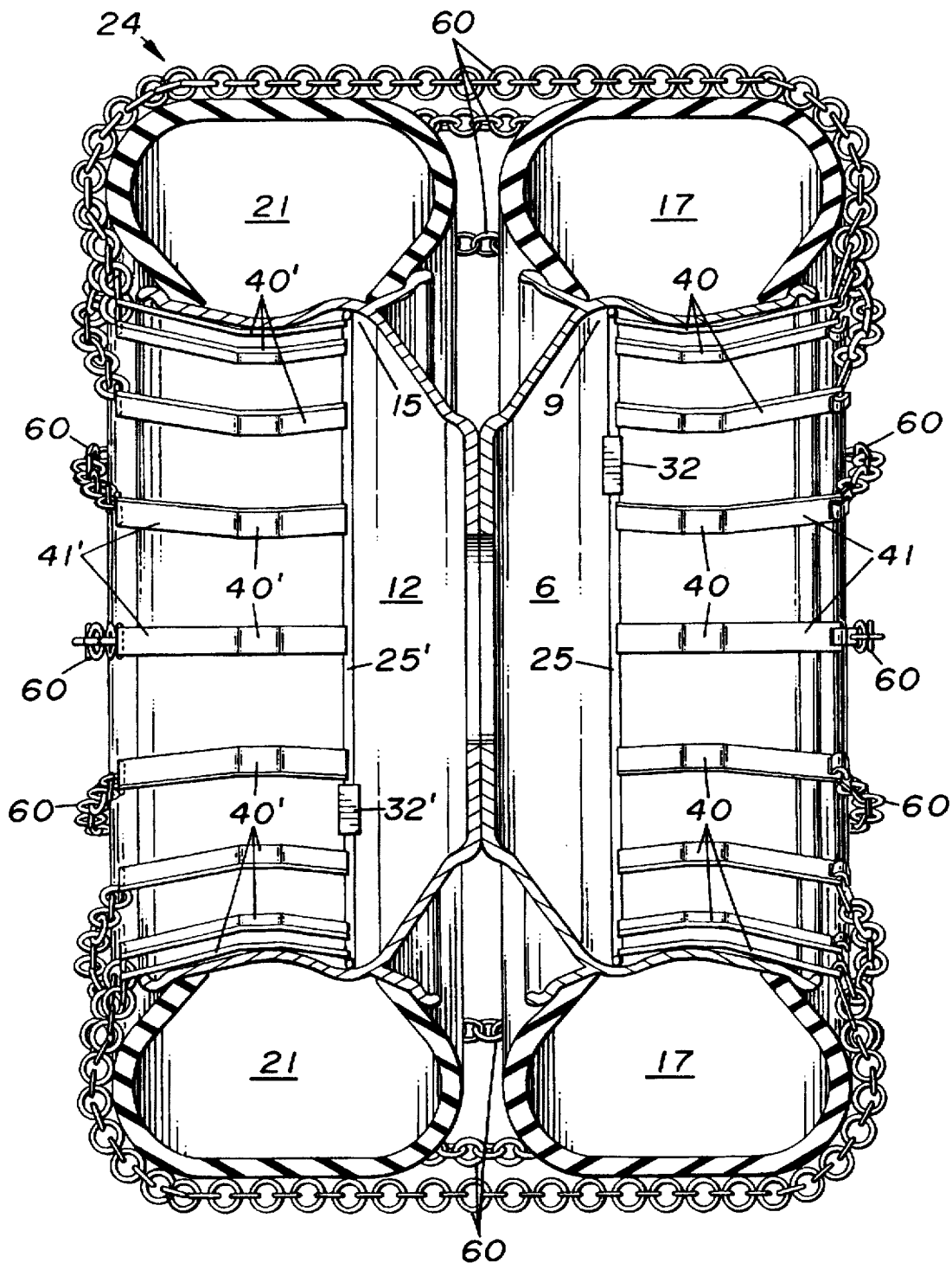
FIG. 3 is a sectional front elevational view of the invention installed around the two tires shown in FIG. 1.
Figure 4:
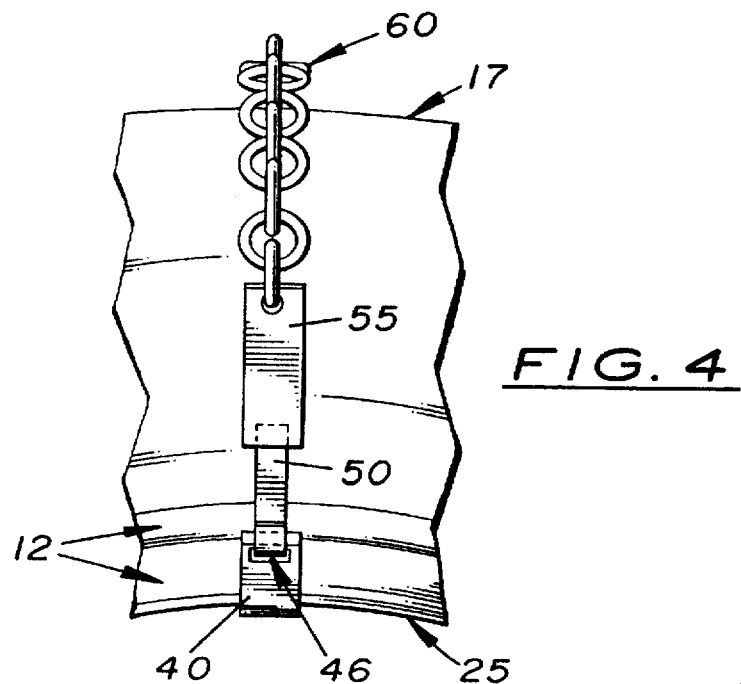
FIG. 4 is a partial side front elevational view of one chain segment attached to the distal end of an arm member.
Figure 5:
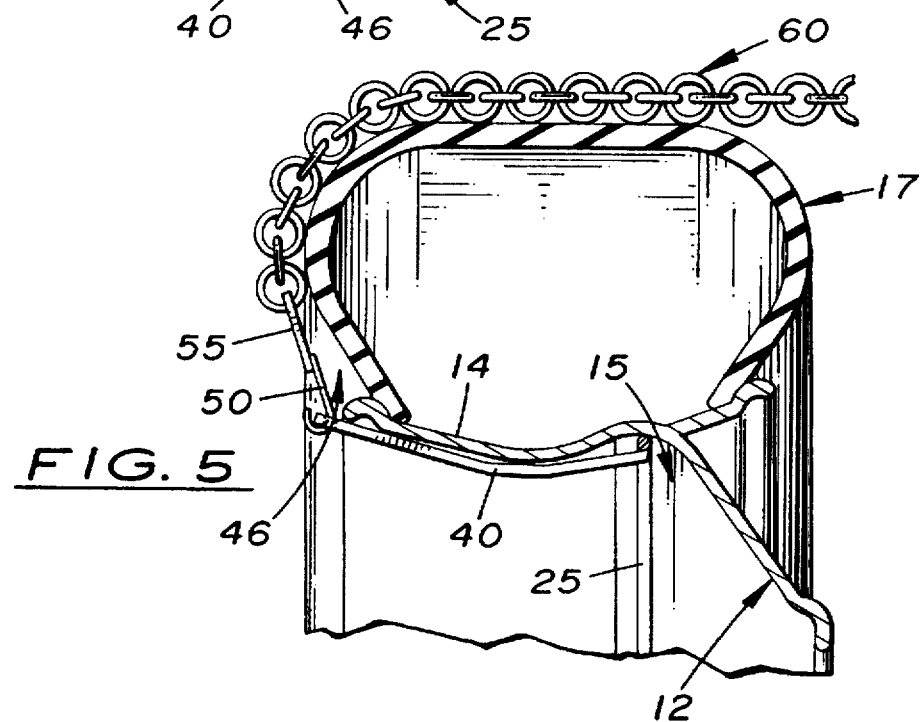
FIG. 5. is a sectional, front elevational view of the chain segment attached to the arm member with the proximal end of the arm member being attached to the retaining ring.

Shown in the accompanying FIGS. 1–6, there is shown an anti-skid device, generally referred to as 24, capable of being used on single or dual wheel arrangements on a motor vehicle. The device 24 includes two retaining rings 25, 25' pre-installed on the outside and inside surfaces of a single wheel hub (not shown) or on the outside surface of an outer hub 6 and the inside surface of the inner hub 12 on a dual tire arrangement (as shown in FIGS. 1, 3 and 5).

Each retaining ring 25, 25' is designed to be adjusted in circumference to fit closely within the indented or recessed surfaces 9, 15 typically manufactured on the outside and inside surfaces of the wheel hubs 6, 12, respectively, as shown in FIG. 3. Each retaining ring 25, 25' is specifically designed for a specific style or type of wheel hub. Each retaining ring 25, 25' is designed to fit snuggly with the recessed surfaces 9, 15, to semi-permanently attach them to the wheel hub so that it remains attached to the wheel hub 6, 12, between uses. In the preferred embodiment, each retaining ring 25, 25' is a flat bar or round stock material made of steel or aluminum capable of bending into a complete circle. In the embodiment shown, round stock material is used which measures approximately ¼" in diameter. The overall length of each retaining ring is sufficient to form a complete circle when placed in the recessed surface on each hub.

Figure 6:
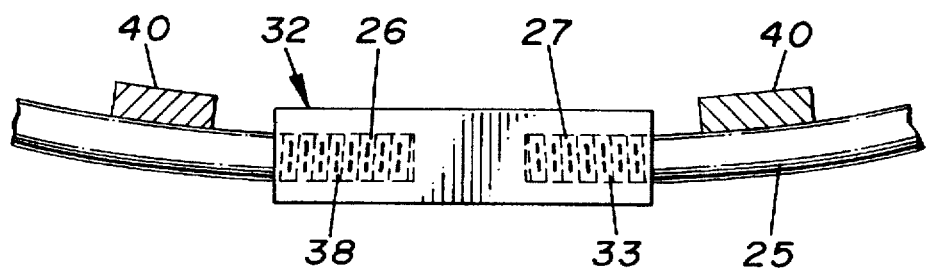
FIG. 6 is a partial front view of the turn buckle used to adjust the length of the retaining ring.

Manufactured on the opposite ends of each retaining ring are treads 26, 27, respectively, as shown in FIG. 6. Treads 26, 27 are in reverse directions and are designed to receive a turn buckle 32 with internal, opposite threaded bores 33, 38. When the retaining ring is positioned on the hub, the opposite threads 26, 27 are aligned adjacent to each other. The turn buckle 32 is then disposed between the opposite threads 26, 27 and turned thereby connecting the opposite ends of the retaining ring together. By rotating the turn buckle 32, the circumference of the retaining ring 25 may be adjusted to securely attach the retaining ring 25 to the recessed surface, 9, 15 of the wheel hub, respectively.

As shown in FIGS. 1–3, radially aligned and evenly spaced apart on each retaining ring 25, 25' are a plurality of transversely aligned, rigid arm members 40, 40', respectively. The arm members 40, 40' are rigidly attached at their proximal ends to the retaining ring 25, 25', respectively. The arms members 40, 40' are aligned on the retaining rings 25, 25' so that they extend towards the outer edge 10 of the wheel hub 6 just over the sidewall 18 of the tire 17. In most instances, the arm members 40, 40' bend outward to closely conform to the sides 8 of the wheel hub 6 and terminate just above the outer edge 10. The arm members 40, 40' are made of rigid material, such as steel or aluminum and are evenly spaced apart and radially aligned on the retaining rings 25, 25' around the central axle opening 7 on the wheel hubs.

A plurality of road engaging segments are radially and transversely disposed over the sidewalls and tread of the tires. In the embodiment shown, the road engaging segment comprise a chain segment 60 is attached between the distal ends 41, 41' of two arm members 40, 40', respectively, located on opposite sides of the hub or hubs. As shown in FIG. 4, the ends of each chain segment 60 are attached to an adjustable attachment means, shown as elastic member 55. The opposite end of the elastic member 55 is attached to a hook member 50 which selectively attaches to a passageway 46 formed on the distal end of the arm member 40. In other embodiments not shown, the adjustable attachment means may be a threaded tightener or clasp. It should be understood that in other embodiments, the chain segment 60 can be replaced with a cable (not shown).

In the embodiment shown in FIGS. 1–3, there are two retaining rings, 25, 25', sixteen pairs of arm members, 40, 40' and sixteen chain segments 60. It should be understood, that the actual number of arm members 40, 40' and chain segments 60 can vary in length and size depending on the size of the wheel hub, the type of wheel arrangment, and tire size.

To use the anti-skid device 24, the wheel hubs and tires are removed from the motor vehicle. The appropriate size of retaining rings 25, 25' and chain segments 60 are selected for the size of wheel hubs and tires. The retaining rings 25, 25' are then installed on a single wheel hub or two dual wheel hubs 6, 12 in the recessed surfaces 9, 15 adjacent to the inside surface of each wheel hub. The retaining rings 25, 25' are aligned on the wheel hubs and then spread outward to fit within the recessed surfaces. The arm members 40 extend outward along the sides of the wheel hub and terminate near the outer edge thereof. Each retaining ring 25, 25' is adjusted in circumference by adjusting the turn buckle 32 to fit closely in the recessed surface 9, 15.

Once the retaining rings 25, 25' are securely installed on the wheel hub, the wheel hub and tire are then installed on the motor vehicle. When weather conditions demand them, the chain segments 60 are attached between two arm members 40, 40' located directly across each other on opposite sides of the hub or adjacent hubs. The chain segments 60 are connected to the hook members 50 and to the passageways 46 on the distal end of each arm member 40, 40'. Because the chain segments 60 are relatively lightweight and the two arm members are within easy reach when kneeling in front of the tire, one individual can easily install the device 24 on the tire. Also, because each chain segments 60 are independently connected to the tire, the motor vehicle does not have to be moved to complete installation of the device 24.

When the device 24 is no longer needed, the chain segments 60 are removed from the tires by disconnecting them from the arm members 40, 40'.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

We claim:

1. An anti-skid device, comprising:
   a) a wheel hub and tire attached thereto, said wheel hub having a radially aligned, recessed surface and an outer edge, said tire having two opposite side walls and a tread surface;
   b) two retaining rings, each said retaining ring capable of being attached on opposite sides of said wheel hub and each said retaining ring being adjustable in circumference to fit tightly on said wheel hub;
   c) a plurality of arm members radially aligned on each said retaining ring, each said arm member having a distal end being aligned outwardly and attached at one end to said retaining ring, each said arm member having a distal end and having sufficient length so that said distal end is located near said outer edge of said wheel hub when said retaining ring is attached to said wheel hub;
   d) a plurality of road engaging segments capable of being attached at opposite ends to said distal ends of opposite said arm members attached to said retaining rings attached to opposite sides of said wheel hub, said road engaging segments being transversely aligned over said side walls and said tread surface of said tire; and,
   e) an adjustable attachment means disposed between each said arm member and said road engaging segment, said adjustable attachment means capable of adjustably and selectively attaching each said road engaging segment to opposite said arm members.

2. An anti-skid device, as recited in claim 1, wherein said adjustable attachment means is an elastic member disposed between said arm member and said chain.

3. An anti-skid device, as recited in claim 1, wherein said adjustable means is an elastic member disposed between said arm member and said chain.

4. An anti-skid device, comprising:
   a) two retaining rings, each said retaining ring capable of being adjusted in circumference to be forcibly attached inside the wheel hub;
   b) a plurality of arm members radially and transversely aligned on each said retaining ring, each said arm member having a distal end and being outwardly aligned on said retaining ring, each said arm member having sufficient length so that said distal end terminates near the outer edge of the wheel hub when said retaining ring is attached thereto;
   c) a plurality of road engaging segments capable of being transversely aligned over a tire attached to the wheel hub and attached to the distal ends on arm members located on opposite sides of the wheel hub; and,
   d) an adjustable attachment means disposed between the opposite ends of each said road engaging segment and said distal end of said arm member to attach each said road engaging segment to opposite said arm members.

5. An anti-skid device, as recited in claim 4, wherein said adjustable attachment means is an elastic member disposed between said arm member and said chain.

* * * * *